(12) United States Patent
Lorgouilloux et al.

(10) Patent No.: US 8,101,154 B2
(45) Date of Patent: Jan. 24, 2012

(54) IM-15 CRYSTALLIZED SOLID AND ITS PROCESS FOR PREPARATION

(75) Inventors: Yannick Lorgouilloux, Limoges (FR); Jean-Louis Paillaud, Mulhouse (FR); Philippe Caullet, Illzach (FR); Joel Patarin, Flaxlanden (FR); Nicolas Bats, Feyzin (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 219 days.

(21) Appl. No.: 12/513,751

(22) PCT Filed: Oct. 1, 2007

(86) PCT No.: PCT/FR2007/001610
§ 371 (c)(1),
(2), (4) Date: Dec. 21, 2009

(87) PCT Pub. No.: WO2008/059120
PCT Pub. Date: May 22, 2008

(65) Prior Publication Data
US 2010/0093518 A1   Apr. 15, 2010

(30) Foreign Application Priority Data
Nov. 7, 2006 (FR) ................... 06 09765

(51) Int. Cl.
*C01B 39/46* (2006.01)
*C01B 39/48* (2006.01)

(52) U.S. Cl. ............. 423/718; 423/708; 502/60; 502/62

(58) Field of Classification Search .................. 423/708, 423/718; 502/60, 62
See application file for complete search history.

(56) References Cited

U.S. PATENT DOCUMENTS

| 8,022,003 B2* | 9/2011 | Perez et al. ...................... 502/60 |
| 2003/0185751 A1* | 10/2003 | Chester et al. ................. 423/705 |
| 2004/0209759 A1 | 10/2004 | Harbuzaru et al. |
| 2004/0220045 A1 | 11/2004 | Mathieu et al. |
| 2007/0014715 A1* | 1/2007 | Chang et al. ................... 423/598 |

FOREIGN PATENT DOCUMENTS

| EP | 1440936 A | 7/2004 |
| EP | 1454882 A | 9/2004 |
| WO | PCTFR2007001610 R | 6/2008 |

OTHER PUBLICATIONS

Corma Avelino et al. "A new mapping/exploration approach for HT synthesis of zeolites." Chemistery of Materials vol. 18 No. 14, (Jul. 11, 2006): 3287-3296. Dutour Julien et al. "Structures and energetics of open-framework germanates; Exploration of hypothetical zeolitic GeO2 structures based on D4R units." Solid State Sciences vol. 8 No. 3-4 special issue (Mar./Apr. 2006): 241-247.
Mathieu Y et al. "Synthesis and characterization of IM-10: a new microporous silicogermanate with a novel topology." Microporous and Mesoporous Materials, vol. 5, No. 1-2, (Oct. 12, 2004): 13-22.

* cited by examiner

*Primary Examiner* — David M Brunsman
(74) *Attorney, Agent, or Firm* — Millen, White, Zelano & Branigan, P.C.

(57) ABSTRACT

A crystallized solid, referred to by the name IM-15, which has an X-ray diffraction diagram as provided below, is described. Said solid has a chemical composition that is expressed according to the formula $mXO_2:nGeO_2:pZ_2O_3:qR:sF:wH_2O$, where R represents one or more organic radical(s), X represents one or more different tetravalent element(s) of germanium, Z represents at least one trivalent element, and F is fluorine.

13 Claims, 1 Drawing Sheet

IM-15 CRYSTALLIZED SOLID AND ITS PROCESS FOR PREPARATION

TECHNICAL FIELD

This invention relates to a new crystallized solid that is called IM-15 below and that has a new crystalline structure as well as a process for preparation of said solid.

PRIOR ART

During recent years, the search for new microporous molecular sieves has led to the synthesis of a large variety of this class of products. A large variety of aluminosilicates with a zeolitic structure that are characterized in particular by their chemical composition, the diameter of the pores that they contain, and the shape and the geometry of their microporous system has thus been developed.

Among the zeolites synthesized for about forty years, a certain number of solids have made it possible to achieve significant progress in the fields of adsorption and catalysis. Among the latter, it is possible to cite the Y zeolite (U.S. Pat. No. 3,130,007) and the ZSM-5 zeolite (U.S. Pat. No. 3,702,886). The number of new molecular sieves that cover the zeolites, synthesized each year, is in constant progression. To have a more complete description of the different molecular sieves that have been discovered, it is possible to refer in a useful manner to the following work: "Atlas of Zeolite Framework Types," Ch. Baerlocher, W. M. Meier and D. H. Olson, Fifth Revised Edition, 2001, Elsevier. It is possible to cite the NU-87 zeolite (U.S. Pat. No. 5,178,748), the MCM-22 zeolite (U.S. Pat. No. 4,954,325) or else the gallophosphate (cloverite) of the CLO-structural type (U.S. Pat. No. 5,420,279) or else the zeolites ITQ-12 (U.S. Pat. No. 6,471,939), ITQ-13 (U.S. Pat. No. 6,471,941), CIT-5 (U.S. Pat. No. 6,043,179), ITQ-21 (WO-02/092511), ITQ-22 (Corma, A. et al., Nature Materials 2003, 2, 493), SSZ-53 (Burton, A., et al., Chemistry: A Eur. Journal, 2003, 9, 5737), SSZ-59 (Burton, A., et al., Chemistry: A Eur. Journal, 2003, 9, 5737), SSZ-58 (Burton, A., et al., J. Am. Chem. Soc., 2003, 125, 1633) and UZM-5 (Blackwell, C. S. et al., Angew. Chem. [Applied Chemistry], Int. Ed., 2003, 42, 1737).

Several zeolites that were cited above have been synthesized in a fluoride medium in which the mobilizing agent is not the usual hydroxide ion but the fluoride ion according to a process that was initially described by Flanigen et al. (U.S. Pat. No. 4,073,865), and then developed by J.-L. Guth et al. (Proc. Int. Zeol. Conf., Tokyo, 1986, p. 121). The pH values of the synthesis media are typically close to neutrality. One of the advantages of these fluorinated reaction systems is to allow purely silicic zeolites that contain fewer defects than the zeolites that are obtained in the traditional OH⁻ medium to be obtained (J. M. Chézeau et al., Zeolites, 1991, 11, 598). Another decisive advantage that is linked to the use of fluorinated reaction media is to make it possible to obtain new silicic framework topologies that contain double cycles with four tetrahedra (D4R) as in the case of the ITQ-7, ITQ-12 and ITQ-13 zeolites. Furthermore, the joint use of germanium and silicon sources in the synthesis media may also make it possible to obtain new frameworks of this type, i.e., containing D4R units, both in non-fluorinated standard basic medium and in fluorinated medium, as in the case of the ITQ-17 and ITQ-21 zeolites (A. Corma et al., Chem. Commun., 2001, 16, 1486, Chem. Commun., 2003, 9, 1050), or IM-12 (J.-L. Paillaud et al., Science, 2004, 304, 990).

DESCRIPTION OF THE INVENTION

This invention has as its object a new crystallized solid, called an IM-15 crystallized solid, which has a new crystalline structure. Said solid has a chemical composition that is expressed by the following general formula: $mXO_2:nGeO_2:pZ_2O_3:qR:sF:wH_2O$, in which R represents one or more organic radical(s), X represents one or more tetravalent element(s) different from germanium, Z represents at least one trivalent element, and F is fluorine, whereby m, n, p, q, s and w respectively represent the number of mols of $XO_2$, $GeO_2$, $Z_2O_3$, R, F and $H_2O$, and m is between 0.01 and 0.5, n is between 0.5 and 0.99, p is between 0 and 0.5, q is between 0 and 1, s is between 0 and 0.5, and w is between 0 and 5.

The IM-15 crystallized solid according to the invention has an X-ray diffraction diagram that includes at least the lines that are inscribed in Table 1. This new IM-15 crystallized solid has a new crystalline structure.

This diffraction diagram is obtained by radiocrystallographic analysis by means of a diffractometer by using the standard powder method with $K\alpha_1$ radiation of copper ($\lambda=1.5406$ Å). Starting from the position of the peaks of diffraction represented by the angle 2θ, the characteristic recticular equidistances $d_{hkl}$ of the sample are calculated by Bragg's equation. The measuring error $\Delta(d_{hkl})$ to $d_{hkl}$ is calculated, based on the absolute error $\Delta(2\theta)$ that is assigned to the measurement of 2θ, by Bragg's equation. An absolute error $\Delta(2\theta)$ that is equal to ±0.02° is commonly allowed. The relative intensity $I/I_o$ that is assigned to each value of $d_{hkl}$ is measured according to the height of the corresponding diffraction peak. The X-ray diffraction diagram of the IM-15 crystallized solid according to the invention comprises at least the lines to the values of $d_{hkl}$ provided in Table 1. In the $d_{hkl}$ column, the mean values of the inter-reticular distances are indicated in angstroms (Å). Each of these values should be provided with the measuring error $\Delta(d_{hkl})$ of between ±0.2 Å and ±0.003 Å. The XRD diagram that has made it possible to set up Table 1 was produced from an IM-15 crystallized solid in its crude synthesis form.

TABLE 1

Mean Values of $d_{hkl}$ and Relative Intensities Measured on an X-Ray Diffraction Diagram of the IM-15 Crystallized Solid

| 2 theta (°) | $d_{hkl}$ (Å) | $I/I_o$ |
|---|---|---|
| 4.91 | 17.98 | ff |
| 5.48 | 16.13 | ff |
| 8.52 | 10.37 | m |
| 9.81 | 9.01 | FF |
| 10.97 | 8.06 | ff |
| 11.53 | 7.67 | ff |
| 13.01 | 6.80 | f |
| 13.90 | 6.37 | ff |
| 14.79 | 5.99 | ff |
| 14.94 | 5.93 | ff |
| 16.33 | 5.43 | ff |
| 17.08 | 5.19 | ff |
| 17.75 | 4.99 | ff |
| 19.70 | 4.50 | ff |
| 22.07 | 4.02 | ff |
| 22.68 | 3.92 | ff |
| 23.68 | 3.75 | ff |
| 24.73 | 3.60 | ff |
| 25.74 | 3.46 | ff |
| 26.17 | 3.40 | ff |
| 26.63 | 3.34 | ff |
| 27.65 | 3.22 | ff |
| 28.03 | 3.18 | ff |
| 30.26 | 2.95 | ff |
| 31.76 | 2.82 | ff |
| 32.60 | 2.74 | ff |
| 34.55 | 2.59 | ff |
| 34.90 | 2.57 | ff |
| 35.99 | 2.49 | ff |
| 37.39 | 2.40 | ff |

TABLE 1-continued

Mean Values of $d_{hkl}$ and Relative Intensities Measured on an X-Ray Diffraction Diagram of the IM-15 Crystallized Solid

| 2 theta (°) | $d_{hkl}$ (Å) | $I/I_o$ |
|---|---|---|
| 39.03 | 2.31 | ff |
| 39.95 | 2.26 | ff |
| 41.35 | 2.18 | ff |
| 43.56 | 2.08 | ff |
| 44.74 | 2.02 | ff |
| 46.19 | 1.96 | ff | where FF=very high; m=medium; f=low; F=high; mf=medium low; ff=very low.

The relative intensity $I/I_o$ is provided in relation to a relative intensity scale where a value of 100 is assigned to the most intense line of the X-ray diffraction diagram: ff<15; 15≦f<30; 30≦mf<50; 50≦m<65; 65≦F<85; FF≧85.

The X-ray diffraction diagram of the IM-15 crystallized solid according to the invention does not comprise the line that has a high $I/I_o$ relative intensity (F) and a medium low $I/I_o$ relative intensity (mf).

BRIEF DESCRIPTION OF DRAWING

The IM-15 crystallized solid according to the invention has a new crystalline structure with a base or topology that is characterized by its X-ray diffraction diagram provided by FIG. 1.

Figure 1:
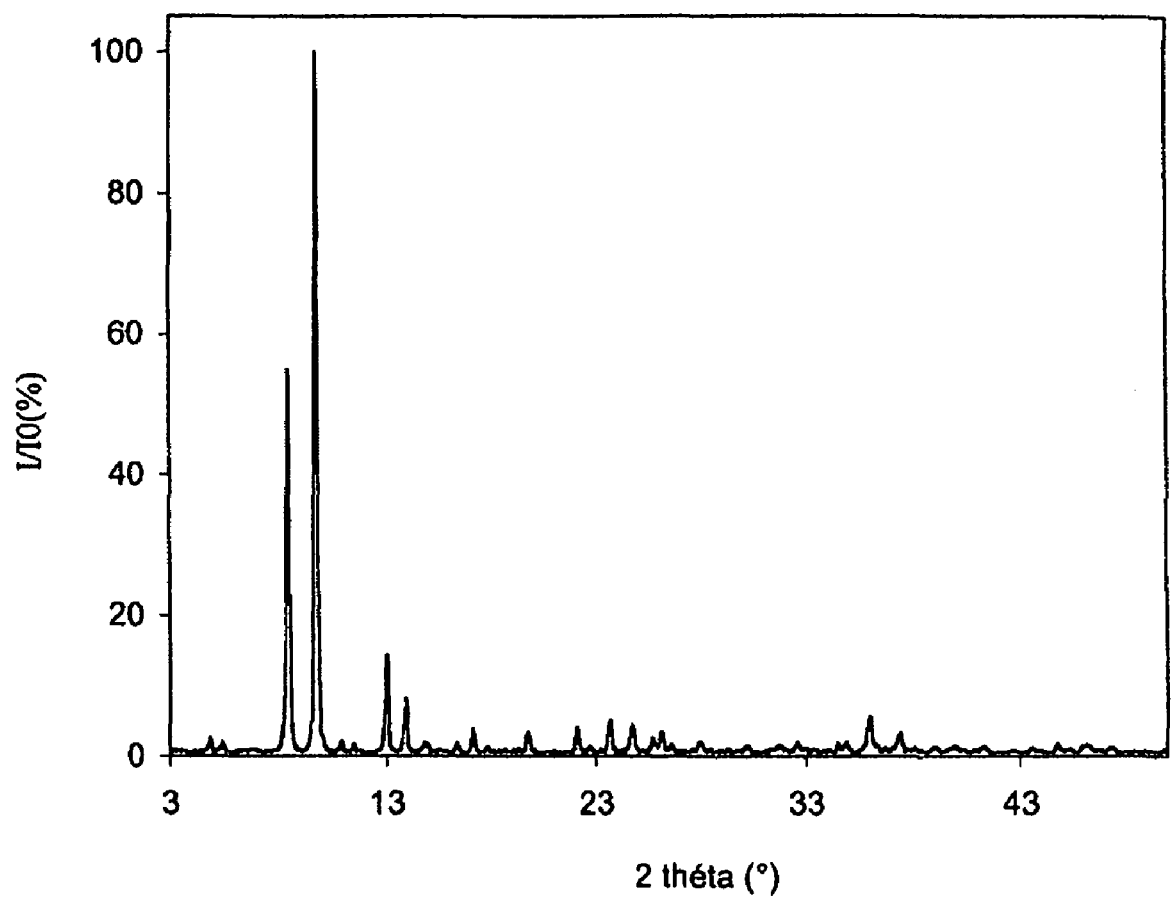
FIG. 1 was set up from an IM-15 crystallized solid in its crude synthesis form.

Said IM-15 solid has a chemical composition that is defined by the following general formula: $mXO_2:nGeO_2:pZ_2O_3:qR:sF:wH_2O$ (I), where R represents one or more organic radical(s), X represents one or more different tetravalent element(s) of germanium, Z represents at least one trivalent element, and F is fluorine. In formula (I), m, n, p, q, s and w respectively represent the number of mols of $XO_2$, $GeO_2$, $Z_2O_3$, R, F and $H_2O$, and m is between 0.01 and 0.5, n is between 0.5 and 0.99, p is between 0 and 0.5, q is between 0 and 1, s is between 0 and 0.5, and w is between 0 and 5.

Advantageously, the X/Ge ratio of the framework of the IM-15 crystallized solid according to the invention is between 0.01 and 1, preferably between 0.05 and 0.25, and very preferably between 0.05 and 0.1. The ratio {(n+m)/p} is greater than or equal to 5 and is preferably greater than or equal to 7. The value of p is between 0 and 0.5, preferably between 0 and 0.4, very preferably between 0 and 0.1, and even more preferably between 0.01 and 0.05. The value of q is between 0 and 1, advantageously between 0.05 and 0.7, and very advantageously between 0.1 and 0.3. According to the invention, s is between 0 and 0.5, preferably s is between 0 and 0.3, and very preferably s is between 0.05 and 0.2. The value taken by w is, according to the invention, between 0 and 5, preferably between 0.2 and 5.

According to the invention, X is preferably selected from among silicon, tin and titanium, and Z is preferably selected from among aluminum, boron, iron, indium and gallium, and very preferably Z is aluminum. In a preferred manner, X is silicon: the IM-15 crystallized solid according to the invention is then, when the element Z is present, a crystallized metallogermanosilicate that has an X-ray diffraction diagram that is identical to the one that is described in Table 1, in particular when it is found in its crude synthesis form. Even more preferably, X is silicon, and Z is aluminum: the IM-15 crystallized solid according to the invention is then a crystallized aluminogermanosilicate that has an X-ray diffraction diagram that is identical to the one that is described in Table 1, in particular when it is found in its crude synthesis form.

In the case where the IM-15 crystallized solid according to the invention comes in its crude synthesis form, i.e., obtained directly from the synthesis and prior to any stage of calcinations(s) and/or ion exchange(s) well known to one skilled in the art, said IM-15 solid comprises at least one organic radical such as the one that is described below or its decomposition products, or else its precursors. In its crude synthesis form, the organic radical(s) R that is (are) present in the general formula and that define the IM-15 solid is (are) at least in part, and preferably entirely, said organic radical(s). According to a preferred embodiment of the invention, R is 1,2-diaminoethane. Said organic radical R, which plays the role of structuring agent, can be eliminated by the standard methods of the prior art such as heat treatments and/or chemical treatments.

The IM-15 crystallized solid according to the invention is preferably a zeolitic solid.

The invention also relates to a process for preparation of the IM-15 crystallized solid in which an aqueous mixture that comprises at least one source of at least one germanium oxide, at least one source of at least one $XO_2$ oxide, optionally at least one source of at least one $Z_2O_3$ oxide, and at least one organic radical R, and optionally at least one source of fluoride ions, is reacted, whereby the mixture preferably has the following molar composition:
  $(XO_2+GeO_2)/Z_2O_3$: at least 5, preferably at least 7,
  $H_2O/(XO_2+GeO_2)$: 1 to 70, preferably 2 to 50,
  $R/(XO_2+GeO_2)$: 0.05 to 5, preferably 0.1 to 3, very preferably 0.25 to 1,
  $GeO_2/XO_2$: 0.3 to 100, preferably 1.5 to 20, and very preferably 4 to 10,
  $F/(XO_2+GeO_2)$: 0 to 2, preferably 0 to 1, and very preferably 0.01 to 0.5,
where X is one or more different tetravalent element(s) of germanium, preferably selected from among silicon, tin, and titanium, and very preferably X is silicon, Z is one or more trivalent element(s) selected from the group that is formed by the following elements: aluminum, iron, boron, indium and gallium, preferably aluminum.

According to the process according to the invention, R is an organic radical that plays the role of organic structuring agent. Preferably, R is the nitrogen-containing compound 1,2-diaminoethane.

The source of the element X can be any compound that comprises the element X and can release this element in aqueous solution in reactive form. Advantageously, when the element X is silicon, the silica source can be any of those currently used in the synthesis of zeolites, for example solid silica in powder form, silicic acid, colloidal silica or dissolved silica or tetraethoxysilane (TEOS). Among the silicas in powder form, it is possible to use precipitated silicas, in particular those that are obtained by precipitation starting from an alkaline metal silicate solution, such as aerosil silicas, pyrogenated silicas, for example "Aerosil," and silica gels. It is possible to use colloidal silicas that have different particle sizes, for example with a mean equivalent diameter of between 10 and 15 nm or between 40 and 50 nm, such as the ones that are marketed under the filed trademark "LUDOX."

The source of the element Z can be any compound that comprises the element Z and that can release this element in aqueous solution in reactive form. In the preferred case where Z is aluminum, the alumina source is preferably sodium aluminate, or an aluminum salt, for example, of chloride, nitrate, hydroxide or sulfate, an alkoxide of aluminum or of alumina itself, preferably in hydrated or hydratable form, such as, for example, colloidal alumina, pseudoboehmite, gamma-alumina or alpha- or beta-trihydrate. It is also possible to use mixtures of the sources that are cited above.

The germanium source can be, for example, a germanium oxide $GeO_2$.

Fluorine can be introduced in the form of salts of alkaline metals or ammonium, such as, for example, NaF, $NH_4F$, $NH_4HF_2$, or in the form of hydrofluoric acid or else in the form of hydrolyzable compounds that can release fluoride anions into the water such as silicon fluoride $SiF_4$ or ammonium fluorosilicates $(NH_4)_2SiF_6$ or sodium fluorosilicates $Na_2SiF_6$.

According to a preferred embodiment of the process according to the invention, an aqueous mixture that comprises silica, optionally alumina, a germanium oxide, 1,2-diaminoethane and a source of fluoride ions is reacted.

The process according to the invention consists in preparing an aqueous reaction mixture that is called a gel and that contains at least one source of at least one germanium oxide, at least one source of at least one $XO_2$ oxide, optionally at least one source of at least one $Z_2O_3$ oxide, optionally at least one source of fluoride ions, and at least one organic radical R. The amounts of said reagents are adjusted so as to impart to this gel a composition that allows its crystallization into IM-15 crystallized solid of general formula $mXO_2:nGeO_2: pZ_2O_3:qR:sF:wH_2O$, where m, n, p, q, s and w meet the criteria that are defined above. Then, the gel is subjected to a hydrothermal treatment until the IM-15 crystallized solid is formed. The gel is advantageously put under hydrothermal conditions under an autogenous reaction pressure, optionally by adding gas, for example nitrogen, at a temperature of between 120° C. and 200° C., preferably between 140° C. and 180° C., and even more preferably at a temperature that does not exceed 175° C. until the IM-15 solid crystals form according to the invention. The period that is necessary for obtaining the crystallization generally varies between 1 hour and several months based on the composition of the reagents in the gel, the stifling and the reaction temperature. The reaction is generally carried out while being stirred or without being stirred, preferably without being stirred.

It may be advantageous to add seeds to the reaction mixture so as to reduce the time that is necessary for the formation of crystals and/or the total crystallization period. It may also be advantageous to use seeds so as to promote the formation of the IM-15 crystallized solid to the detriment of impurities. Such seeds comprise crystallized solids, in particular IM-15 solid crystals. The crystalline seeds are generally added in a proportion of between 0.01 and 10% of the mass of the $(XO_2+GeO_2)$ oxides, whereby $XO_2$ is preferably silica, used in the reaction mixture.

At the end of the reaction, the solid phase is filtered and washed; it is then ready for subsequent stages such as drying, dehydration and calcination and/or ion exchange. For these stages, all of the conventional methods that are known to one skilled in the art can be used.

This invention also relates to the use of said IM-15 solid as an adsorbent.

Preferably, the organic radical, preferably 1,2-diaminoethane, is removed from said IM-15 solid when it is used as an adsorbent. When it is used as an adsorbent, the IM-15 crystallized solid according to the invention is generally dispersed in an inorganic matrix phase that contains channels and cavities that allow the access of the fluid that is to separate into the crystallized solid. These matrices are preferably mineral oxides, for example silicas, aluminas, silica-aluminas or clays. The matrix in general represents between 2 and 25% by mass of the thus formed adsorbent.

The invention is illustrated by means of the following examples.

EXAMPLE 1

Preparation of an IM-15 Solid According to the Invention 0.464 ml (0.417 g) of 1,2-diaminoethane (Aldrich) is added to 10 ml of distilled water in a 20 ml Teflon container. The mixture is stirred for 5 minutes using a magnetic stirring mechanism, and then 1.162 g of amorphous germanium oxide (Aldrich) is added. The mixture is stirred for 1 hour. 1.001 g of Aerosil 200 (amorphous silica, Degussa) is then introduced. The mixture is then stirred for 3 hours.

The molar composition of the gel that is obtained is: 0.6 $SiO_2$:0.4 $GeO_2$:0.25 1,2-diaminoethane:20 $H_2O$.

The Teflon jacket that contains the synthesis mixture (pH~10.5) is then introduced into an autoclave, which is placed in a drying oven at 170° C. for a duration of 14 days without being stirred. After filtration, the product that is obtained is washed several times with distilled water. It is then dried at 70° C. for 24 hours. The mass of dry product that is obtained is approximately 1.95 g.

The dried solid product was analyzed by X-ray diffraction and identified as consisting of IM-15 solid and amorphous phase.

EXAMPLE 2

Preparation of an IM-15 Solid According to the Invention 1.856 ml (1.668 g) of 1,2-diaminoethane (Aldrich) is added to 10 ml of distilled water in a 20 ml Teflon container. The mixture is stirred for 5 minutes using a magnetic stirring mechanism, and then 2.615 g of amorphous germanium oxide (Aldrich) is added. The mixture is stirred for 1 hour. 0.167 g of Aerosil 200 (amorphous silica, Degussa) is then introduced. The mixture is then stirred for 3 hours.

The molar composition of the gel that is obtained is: 0.1 $SiO_2$:0.9 $GeO_2$:1 1,2-diaminoethane:20 $H_2O$.

The Teflon jacket that contains the synthesis mixture (pH~12) is then introduced into an autoclave, which is placed in a drying oven at 170° C. for a period of 14 days without being stirred. After filtration, the product that is obtained is washed several times with distilled water. It is then dried at 70° C. for 24 hours. The mass of dry product that is obtained is approximately 2.32 g.

The dried solid product was analyzed by X-ray diffraction and identified as consisting only of IM-15 solid.

EXAMPLE 3

Preparation of an IM-15 Solid According to the Invention 0.928 ml (0.834 g) of 1,2-diaminoethane (Aldrich) is added to 9.985 ml of distilled water in a 20 ml Teflon container. The mixture is stirred for 5 minutes using a magnetic stifling mechanism, and then 0.044 g of aluminum hydroxide (63 to 67% by mass of $Al_2O_3$, Fluka) and 2.615 g of germanium oxide (Aldrich) are added. The mixture is stirred for 1 hour. 0.167 g of Aerosil 200 (amorphous silica, Degussa) is then introduced. The mixture is then stirred for 3 hours.

The molar composition of the gel that is obtained is: 0.1 $SiO_2$:0.9 $GeO_2$:0.01 $Al_2O_3$:0.5 1,2-diaminoethane:20 $H_2O$.

The Teflon jacket that contains the synthesis mixture (pH~11.5) is then introduced into an autoclave, which is placed in a drying oven at 170° C. for a period of 14 days without being stifled.

After filtration, the product that is obtained is washed several times with distilled water. It is then dried at 70° C. for 24 hours. The mass of dry product that is obtained is approximately 2.15 g.

The dried solid product was analyzed by X-ray diffraction and identified as consisting of IM-15 solid.

EXAMPLE 4

Preparation of an IM-15 Solid According to the Invention 2.784 ml (2.502 g) of 1,2-diaminoethane (Aldrich) is added to 10.167 ml of distilled water in a 20 ml Teflon container. The mixture is stirred for 5 minutes using a magnetic stifling mechanism, and then 4.358 g of germanium oxide (Aldrich) is added. The mixture is stirred for 1 hour. 6.191 ml (5.782 g) of TEOS (tetraethoxysilane, Fluka) is then introduced. The mixture is then stirred for 10 to 12 hours at ambient temperature so as to evaporate the ethanol that is formed by the hydrolysis of the TEOS. The subsequent addition of 1.228 ml (1.388 g) of an aqueous HF solution (40% by mass of hydrofluoric acid, Carlo Erba) is manifested as an increase in the viscosity of the reaction mixture. The mixture is then stirred manually using a stainless steel spatula for 5 to 10 minutes. After weigh-in and adjustment of the required water content, the molar composition of the mixture that is obtained is: 0.4 $SiO_2$:0.6 $GeO_2$:0.6 1,2-diaminoethane:0.4 HF:8 $H_2O$.

The Teflon jacket that contains the synthesis mixture (pH~10) is then introduced into an autoclave, which is placed in a drying oven at 170° C. for a period of 14 days without being stifled.

After filtration, the product that is obtained is washed several times with distilled water. It is then dried at 70° C. for 24 hours. The mass of dry product that is obtained is approximately 5.78 g.

The dried solid product was analyzed by X-ray diffraction and identified as consisting of IM-15 solid.

EXAMPLE 5

Preparation of an Adsorbent that Contains the IM-15 Crystallized Solid

The solid that is used is the synthetic crude solid of Example 1 and comprises the organic radical 1,2-diaminoethane. This solid first undergoes heating with flushing by nitrogen at the temperature of 200° C. for 4 hours and then calcination still under nitrogen atmosphere at 550° C. for 8 hours. Following these first treatments, the solid that is obtained is calcined at 550° C. for 8 hours under a stream of air and then for 8 more hours under a stream of oxygen.

The solid that is obtained is then put in extrudate form by mixing with boehmite (Pural SB3, Sasol) in a Z-arm mixing machine and by extrusion of the paste that is obtained with a piston extruder. The extrudates are then dried at 120° C. for 12 hours in air and calcined at 550° C. for 2 hours in a stream of air in a muffle furnace.

The thus prepared adsorbent consists of 80% IM-15 zeolitic solid and 20% alumina.

The invention claimed is:

1. An IM-15 crystallized solid that has an X-ray diffraction diagram that includes at least the lines that are inscribed in the table below:

| 2 theta (°) | $d_{hkl}$ (Å) | $I/I_o$ |
|---|---|---|
| 4.91 | 17.98 | ff |
| 5.48 | 16.13 | ff |
| 8.52 | 10.37 | m |
| 9.81 | 9.01 | FF |
| 10.97 | 8.06 | ff |
| 11.53 | 7.67 | ff |
| 13.01 | 6.80 | f |
| 13.90 | 6.37 | ff |
| 14.79 | 5.99 | ff |
| 14.94 | 5.93 | ff |
| 16.33 | 5.43 | ff |
| 17.08 | 5.19 | ff |
| 17.75 | 4.99 | ff |
| 19.70 | 4.50 | ff |
| 22.07 | 4.02 | ff |
| 22.68 | 3.92 | ff |
| 23.68 | 3.75 | ff |
| 24.73 | 3.60 | ff |
| 25.74 | 3.46 | ff |
| 26.17 | 3.40 | ff |
| 26.63 | 3.34 | ff |
| 27.65 | 3.22 | ff |
| 28.03 | 3.18 | ff |
| 30.26 | 2.95 | ff |
| 31.76 | 2.82 | ff |
| 32.60 | 2.74 | ff |
| 34.55 | 2.59 | ff |
| 34.90 | 2.57 | ff |
| 35.99 | 2.49 | ff |
| 37.39 | 2.40 | ff |
| 39.03 | 2.31 | ff |
| 39.95 | 2.26 | ff |
| 41.35 | 2.18 | ff |
| 43.56 | 2.08 | ff |
| 44.74 | 2.02 | ff |
| 46.19 | 1.96 | ff | where FF=very high; m=medium; f=low; F=high; mf=medium low; ff=very low, and that has a chemical composition that is expressed by the following general formula: $mXO_2$:$nGeO_2$:$pZ_2O_3$:qR:sF:$wH_2O$, in which R represents one or more organic radical(s), X represents one or more tetravalent element(s) different from germanium, Z represents at least one trivalent element, and F is fluorine, whereby m, n, p, q, s and w respectively represent the number of mols of $XO_2$, $GeO_2$, $Z_2O_3$, R, F and $H_2O$, and m is between 0.01 and 0.5, n is between 0.5 and 0.99, p is between 0 and 0.5, q is between 0 and 1, s is between 0 and 0.5, and w is between 0 and 5.

2. An IM-15 crystallized solid according to claim 1 in which X is silicon.

3. An IM-15 crystallized solid according to claim 2 in which Z is aluminum.

4. An IM-15 crystallized solid according to claim 3, in which the ratio {(n+m)/p} is greater than or equal to 5, p is between 0.01 and 0.05, q is between 0.1 and 0.3, s is between 0.05 and 0.2, and w is between 0.2 and 5.

5. An IM-15 crystallized solid according to claim 2, in which the ratio {(n+m)/p} is greater than or equal to 5, p is between 0.01 and 0.05, q is between 0.1 and 0.3, s is between 0.05 and 0.2, and w is between 0.2 and 5.

6. An IM-15 crystallized solid according to claim 1 in which Z is aluminum.

7. An IM-15 crystallized solid according to claim 6, in which the ratio {(n+m)/p} is greater than or equal to 5, p is between 0.01 and 0.05, q is between 0.1 and 0.3, s is between 0.05 and 0.2, and w is between 0.2 and 5.

8. An IM-15 crystallized solid according to claim 1, in which the ratio {(n+m)/p} is greater than or equal to 5, p is between 0.01 and 0.05, q is between 0.1 and 0.3, s is between 0.05 and 0.2, and w is between 0.2 and 5.

9. An adsorbent comprising alumina and an IM-15 crystallized solid according to claim 1.

10. A process for the preparation of an IM-15 crystallized solid according to claim 1, comprising initiating mixing at least one source of at least one germanium oxide $GeO_2$, at least one source of at least one $XO_2$ oxide, optionally at least one source of at least one $Z_2O_3$ oxide, optionally at least one source of fluoride ions, and at least one organic radical R, and then initiating hydrothermal treatment of resultant reaction mixture until said IM-15 crystallized solid crystallizes.

11. A process for preparation of an IM-15 crystallized solid according to claim 10, wherein the molar composition of the reaction mixture is:

$(XO_2+GeO_2)/Z_2O_3$: at least 5,
$H_2O/(XO_2+GeO_2)$: 1 to 70,
$R/(XO_2+GeO_2)$: 0.05 to 5,
$GeO_2/XO_2$: 0.3 to 100,
$F/(XO_2+GeO_2)$: 0 to 2.

12. A process for preparation of an IM-15 crystallized solid according to claim 10, wherein said organic radical R is 1,2-diaminoethane.

13. A process for preparation of an IM-15 crystallized solid according to claim 10, wherein seeds of IM-15 are added into the reaction mixture.

* * * * *